US007105977B2

(12) United States Patent
Kobayashi

(10) Patent No.: US 7,105,977 B2
(45) Date of Patent: Sep. 12, 2006

(54) METAL-GRAPHITE BRUSH AND MOTOR INCLUDING METAL-GRAPHITE BRUSH

(75) Inventor: Hiroshi Kobayashi, Kariya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 11/208,594

(22) Filed: Aug. 23, 2005

(65) Prior Publication Data

US 2006/0043819 A1 Mar. 2, 2006

(30) Foreign Application Priority Data

Aug. 26, 2004 (JP) ............................ 2004-247279

(51) Int. Cl.
*H02K 13/00* (2006.01)
*H01R 39/20* (2006.01)
*C10M 125/02* (2006.01)
*C04B 35/52* (2006.01)

(52) U.S. Cl. ....................... 310/252; 310/253; 310/248

(58) Field of Classification Search ................ 310/253, 310/148, 248, 252, 251
See application file for complete search history.

(56) References Cited

U.S. PATENT DOCUMENTS 2,425,046 A * 8/1947 Ramadanoff ................ 428/408
2,462,055 A * 2/1949 Herwig ....................... 252/509
3,772,080 A * 11/1973 McKee ....................... 427/114
3,996,408 A * 12/1976 Fridman et al. ............ 428/408
6,068,926 A * 5/2000 Sperling et al. ............ 428/408
2003/0155836 A1* 8/2003 Uda et al. ................... 310/239
2005/0062350 A1* 3/2005 Kuo et al. .................... 310/90
2005/0236925 A1 10/2005 Kobayashi et al.

FOREIGN PATENT DOCUMENTS

JP 5-236708 9/1993
JP 2001-298913 10/2001
JP 2004-173486 6/2004
JP 2004173486 A * 6/2004

* cited by examiner

*Primary Examiner*—Darren Schuberg
*Assistant Examiner*—Erik Preston
(74) *Attorney, Agent, or Firm*—Oblon, Spivak, McClelland, Maier & Neustadt, P.C.

(57) ABSTRACT

A metal-graphite brush for supplying electricity to a coil wound around a core provided at a rotor of a motor is made of sintered material having porosities at a surface and inside thereof, and the porosities is infiltrated with a conductive liquid having a boiling point higher than that of water.

9 Claims, 4 Drawing Sheets

METAL-GRAPHITE BRUSH AND MOTOR INCLUDING METAL-GRAPHITE BRUSH

CROSS REFERENCE TO RELATED APPLICATIONS

This application is based on and claims priority under 35 U.S.C. § 119 to Japanese Patent Application 2004-247279, filed on Aug. 26, 2004, the entire content of which is incorporated herein by reference.

FIELD OF THE INVENTION

This invention generally relates to a metal-graphite brush for supplying electricity to a rotor of a motor. More particularly, this invention relates to a metal-graphite brush and a motor having a metal-graphite brush by which mechanical loss and electrical loss can be improved.

BACKGROUND

By use of a motor having a brush, electricity is supplied through the brush sliding on a commutator. Specifically, a coil wound around a core of a rotor is connected to the commutator, and when electricity is supplied to the coil, the rotor starts to rotate by virtue of the forces of attraction and repulsion applied from a permanent magnet provided in a housing so as to face the rotor.

In the motor having the above configuration, because the brush and the commutator is solid, when the motor is operated, the brush slides on the commutator depending on roughness of each surface of the brush and the commutator. Microscopically, the brush slides on the commutator with contacting to the commutator at three points, and these points are changed depending on each slide. Thus, by use of the motor having a brush, mechanical loss and electrical loss occur. Specifically, the mechanical loss includes such as wear on the brush and the commutator caused by the slide, and the electrical loss occurs when a contact voltage is reduced.

On the other hand, a known metal-graphite brush, which is applied to a vehicle, is made by mixing graphite particles and copper particles in a binder and sintering the mixture. (JP2001-298913A).

A known method for manufacturing such metal-graphite brush is as follows. First, natural graphite particles, as a base material, and a phenol resin solution, as a binder, are mixed. Next, a lubricant, such as molybdenum disulfide, is added to the mixture. Then, the mixture is sintered in a nitrogen-rich atmosphere at a temperature within a range of from 700 to 800° C. In this case, the film of dissolved phenol resin formed on the surface of the graphite particles is carbonized by a process of reduction sintering so as to become amorphous graphite. This amorphous graphite is used as a binder in order to bind graphite particles. In addition, because a part of the organic substances, originally included in the solution of phenol resin, sublimate as a carbon dioxide, or as water vapor, many porosities are formed on both the surface and the interior of the sintered material. By virtue of the hygroscopic property of the graphite particles, the metal-graphite brush, which is made of the graphite particles by the method described above, can absorb moisture in the atmosphere, as long as the metal-graphite brush is left in atmospheric air.

If the metal-graphite brush described above is attached to a motor, when the metal-graphite brush is operated, the temperatures of the slide surfaces of the metal-graphite brush and of the commutator rise. Accordingly, moisture, originally contained in inner porosities located near the slide surfaces of the metal-graphite brush, starts to vaporize. Then, the vaporized moisture gathers on the slide surfaces of the metal-graphite brush and the commutator. Therefore, because a coefficient of sliding friction between the slide surfaces of the metal-graphite brush and of the commutator is lowered by the vaporized moisture, in other words, because of the effects of gaseous lubrication, the degree of wears on the metal-graphite brush can be reduced.

However, when such motor having the metal-graphite brush is applied to the vehicle, because of heat in the engine room, temperatures at the slide surfaces of the metal-graphite brush and of the commutator may rise to 100 degree Celsius or more. In this case, because moisture, originally contained in inner porosities located near the slide surfaces of the metal-graphite brush, starts to vaporize rapidly, the vaporized moisture may not exist on the slide surfaces of the metal-graphite brush and the commutator. Thus, the metal-graphite brush slides on the commutator without the vaporized moisture on each of the slide surfaces, as a result, a coefficient of sliding friction between the slide surfaces of the metal-graphite brush and of the commutator is increased. Thus, when the motor having a metal-graphite brush is used at a high temperature, especially at 100 degree Celsius or more, the metal-graphite brush wears quickly, as a result, duration of life of the motor having a metal-graphite brush is shortened.

To avoid such problems, another process for making a metal-graphite brush is disclosed in, for example JP2004-173486A. In this process, porosities formed on the surface or inside of the sintered material of the metal-graphite brush are infiltrated with liquid having a boiling point higher than that of water. According to this invention, even when the motor is used under a temperature of 100 degree Celsius or more, moisture infiltrated inner porosities located near the slide surfaces of the metal-graphite brush does not completely vaporize, and the vaporized moisture exists on the slide surfaces of the metal-graphite brush and the commutator. Thus, a coefficient of sliding friction between the slide surfaces of the metal-graphite brush and of the commutator can be reduced, as a result, the degree of wear on the metal-graphite brush can be decreased.

Further electrical loss occurs when such metal-graphite brush is used in the motor. Specifically, the contact voltage of the metal-graphite brush is significantly reduced comparing to a contact voltage of a known metal brush. For example, when the metal-graphite brush including copper powder at 60% or more by weight and having relatively high current density is used, its contact resistance becomes 50 mΩ, and contact voltage between the brush and the commutator is reduced at from 0.4V to 0.5V.

To avoid such reduction of the contact voltage, another process for making a metal-graphite brush is disclosed in, for example JP05-236708A. Instead of copper powder, this a metal-graphite brush includes a conductive staple metal fiber, a compounding short fiber in which a conductive metal film is provided on a surface in a longitudinal direction of the carbon fiber; and a compounding short fiber, in which the conductive metal film is provided on a surface in a longitudinal direction of a conductive staple metal fiber and a surface in a longitudinal direction of the carbon fiber; in order to reduce the contact resistance of the brush.

As mentioned above, when the porosities of the metal-graphite brush are infiltrated with liquid having a boiling point higher than that of water, because of the effects of gaseous lubrication, even when the brush is used under a temperature of 100 degree Celsius or more, degree of mechanical wear of the brush can be reduced. However, in such metal-graphite brush, electrical loss has not been considered. For example, when the glycol type liquid or the glycol ether type liquid is used as liquid which infiltrates the porosities of the brush, because the glycol type liquid and the glycol ether type liquid has insulating property, electrical loss will be further enhanced.

Further, when the liquid having insulating property is applied to the slide surfaces, because electric resistance is enhanced as mentioned above, sparks may frequently occur on the surface of metal-graphite brush, as a result, degree of mechanical wear on the metal-graphite brush may be further increased.

On the other hand, when the metal-graphite brush uses the conductive staple metal fiber instead of copper powder, mechanical loss and electrical loss are not sufficiently improved comparing to another known metal graphite brushes.

Thus, a need exist to provide a metal-graphite brush or a motor having the metal-graphite brush by which mechanical loss and electrical loss can be preferably improved.

SUMMARY OF THE INVENTION

According to an aspect of the present invention, a metal-graphite brush, is made of sintered material and having porosities at a surface and inside thereof, for supplying electricity to a coil wound around a core provided at a rotor of a motor, and the porosities is infiltrated with a conductive liquid having a boiling point higher than that of water.

According to another aspect of the present invention, a motor comprises a housing, a magnet provided within the housing, a rotor including a coil wound around a core and provided so as to face the magnet and be rotatable within the housing, a shaft for supporting the rotor to the housing, a commutator provide at the rotor for supplying electricity to the coil; and a metal-graphite brush sliding on the commutator, wherein the metal-graphite brush is made of sintered material having porosities at a surface and inside thereof, and the porosities is infiltrated with a conductive liquid having a boiling point higher than that of water.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
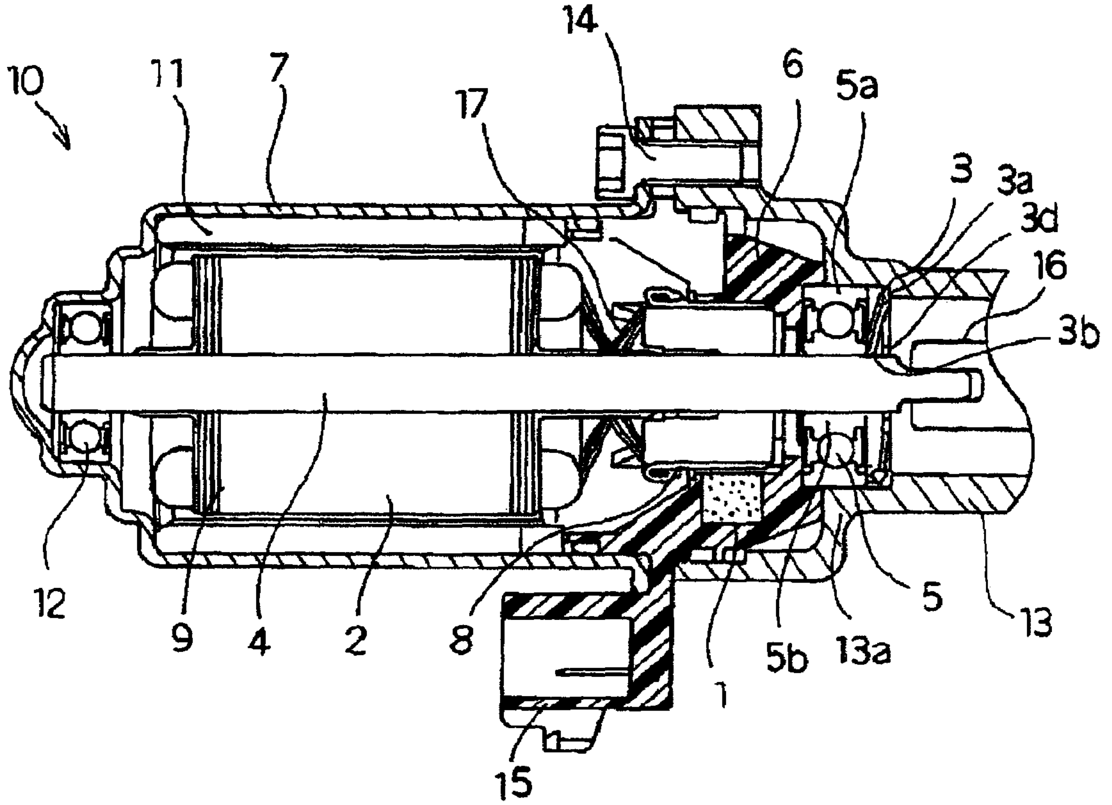
FIG. 1 illustrates a cross section indicating a configuration of a motor in which metal-graphite brush according to an embodiment of the present invention is used.

An embodiment of the present invention will be explained with reference to drawing figures. FIG. 1 represents a cross-sectional view illustrating a configuration of a motor 10 having a metal-graphite brush 1 (simply referred hereinafter as a brush) for supplying electricity to a rotor 2. First, a configuration of the motor 10 will be briefly explained with reference to FIG. 1.

In the motor 10, illustrated in FIG. 1, the rotor 2 rotates within a housing 7. Specifically, the rotor 2 is rotatably provided in the housing 7 that has a cylindrical shape and is made of metal. The housing 7 is fastened to a housing 13 by means of a fastening member 14 such as a bolt so as to be integrated into a unit with the housing 13. The rotor 2 is supported by a shaft 4. The shaft 4 has two parallel planes provided at one end of the shaft 4 (right side in FIG. 1). From an axial direction to be connected with the driven shaft 16, the two parallel planes of the shaft 4 are inserted into an approximately rectangular hole provided at one end of a driven shaft 16 of a driven machine. Thus, the shaft 4 is connected to the driven shaft 16, and a rotation of the rotor 10 can be externally transmitted through the driven shaft 16.

A core 9 of the rotor 2 is formed by layering plural metal plates in an axial direction. The shaft 4 is inserted through a center of the core 9 by means of pressing and integrated into a unit with the core 9. Thus, the rotor 2 and the shaft 4 rotate together as a unit. The other end of the shaft 4 is inserted into an inner ring of a bearing (a first bearing) 12, pressed and fitted into one end of the housing 7, and thus rotatably supported in the housing 7 by means of the bearing 12. On the other hand, along an inner surface of the cylindrical housing 7, plural arc-shape magnets 11 are attached by means of an adhesive material or the like, in a peripheral direction.

Further, the housing 13, to which the housing 7 is attached, includes a recessed portion 13*a* provided at a motor-attachment surface of the housing 13 for attaching the rotor 2. An outer ring 5*a* of the bearing 5 is pressed into the recessed portion 13*a*. The shaft 4 is supported by the bearing 5. Thus, the shaft 4 for supporting the rotor 2 is rotatably supported by the two bearings 5, 12 at both ends of the shaft 4. In this case, the opposite end of the shaft 4, opposite to the position at which the bearing 12 is pressed, is pressed into an inner ring 5*b* of the bearing 5. The outer ring 5*a* of the bearing 5 is pressed into the inner side of the recessed portion 13*a* of the housing 13 so as to be positioned along the inner diameter of the recessed portion 13*a*. In addition, a spring 3 is provided between the housing 13 of the motor 10 and the bearing 5.

The spring 3 is made from a disk-shape plate of metal having strong elasticity (a high spring constant). The disk-shape plate has a hole 3*d* at the center. The shaft 4 is penetrated through the hole 3*d*. The disk-shape plate has three slits in a radial direction positioned at distances of 120°. Each slit has an extending slit portion extending clockwise (or counter clockwise) along a peripheral direction of the disk-shape plate. The disk-shape plate is bended in an axial direction into a three-dimensional form so as to form biasing portions 3*b* contiguous with supporting portions 3*a*. The supporting portions 3*a* of the spring 3 make contact with a peripheral stepped portion of the recessed portion 13*a* so as to engage with the same. The biasing portions 3*b* of the spring 3 make contact with a side surface of the outer ring 5*a* of the bearing 5 so as to bias the bearing 5 in an axial direction (left direction in FIG. 1).

On the other hand, a holder 6 is provided near the bearing 5 so as to face the rotor 2. The holder 6 is made of resin, and is provided so as to have the same axis as the housing 7. In addition, the holder 6 includes two brushes 1 (only one of the brushes is illustrated in FIG. 1) for supplying electricity from the commutator 8 to the coil 17, wound around the core 9 provided at the rotor 2, by making contact with the commutator 8. In addition, a connector 15 for supplying electricity from the exterior to the rotor 2 through the brush 1 is provided at the holder 6 so as to form an integral unit with the holder 6. When an external connector (not illustrated) is connected to the connector 15, electricity can be supplied, through the brush 1, to the coil 17 wound around the core 9 of the rotor 2. When electricity is supplied to the coil 17, electromagnetic force of attraction and repulsion is generated between the rotor 2 and the magnets 11, and the rotor 2 starts to rotate.

Figure 2:
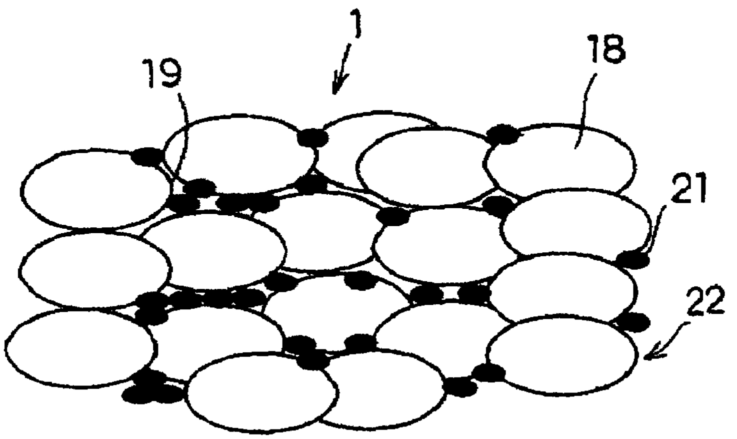
FIG. 2 illustrates a pattern diagram indicating a composition of the metal metal-graphite brush.

The brush 1, employed in the motor 10 configured and operated as above, will be explained in detail below. The brush 1, according to the embodiment of the present invention, is made of a sintered material 22 having a base of natural graphite particles 18, as illustrated in FIG. 2. The sintered material 22 includes a number of porosities 19 on both the surface and the interior of the sintered material 22. Firstly, an example of a manufacturing method of the sintered material 22, which can be made into the brush 1, will be explained with reference to FIG. 3.

For manufacturing the brush 1, natural graphite particles 18 (particle diameter: approximately from 1 μm to 300 μm), and novolac-type (or resoll-type) phenol resin of granular pellets, 2–3% by weight, as expressed in terms of the graphite particles 18 being 100%, are prepared. (S1). Then, the novolac-type (or resoll-type) phenol resin is dissolved in alcohol type solvent so as to make a phenol resin solution (S2). As the alcohol type solvent, methyl alcohol, or the like, can be utilized in this step. In addition, alcohol type solvent is not limited. For solving the phenol resin, ketone, such as acetone, can also be utilized. In other words, in the step of solving the phenol resin, a thickness of film formed on the surface of the graphite particles varies commensurately with the viscosity of the dissolved phenol resin added to the graphite particles 18. After that, dissolved resin, in other words, the phenol resin dissolved in the methyl alcohol, is sprayed over the natural graphite particles (S3). In the spraying step (S3), the dissolved resin is sprayed so as to form a uniform film of dissolved resin on the surface of the graphite particles 18.

Next, the graphite particles 18 kneaded, with the dissolved resin that has been sprayed onto the surface (S4). In this step of kneading, the graphite particles 18 are kneaded by use of a kneading apparatus for a predetermined duration (for example, from approximately 3 to 5 hours) so as to homogenize the graphite particles 18. After that, the graphite particles that have been homogenized are left in atmospheric air conditions for 30 minutes so as to be dried, and then extruded so as to be in a predetermined shape, such as 0.5 mm in diameter and 2 mm in length. (S5).

Next, the graphite particles (graphite granulation particles) 18, obtained in the extruding process, are mixed with copper powder in order to incorporate, during the operation of the motor, the level of current flowing into the brush 1 to within a predetermined current density, corresponding to the level of electric current that is intended to apply to the brush 1 (S6). At the same time, in order to improve a sliding property with the commutator 8, it is preferable that a solid lubricant such as molybdenum disulfide also be mixed. By these processes, the copper powder and the molybdenum disulfide are mixed, and thus homogenized (S7). After that, by means of pressing, or the like, a brush 1 of a desired shape can be formed by use of a pressing apparatus (S8). Then, a product obtained by the process of pressing is reduction fired, for from 2 to 3 hours (S9), in a nitrogen-rich atmosphere at a temperature of from 700° C. to 800° C. (S9).

When the phenol resin is reduction fired, an amorphous graphite is generated, and the graphite particles are bind together by means of the generated amorphous graphite, and thus a sintered material 22 with the shape of a brush is made. On both the surface and the inside of the sintered material 22, which has been made up according to the processes described above, as illustrated in the process diagram of FIG. 2, multiple porosities 19 are formed between adjacent graphite particles.

Figure 3:
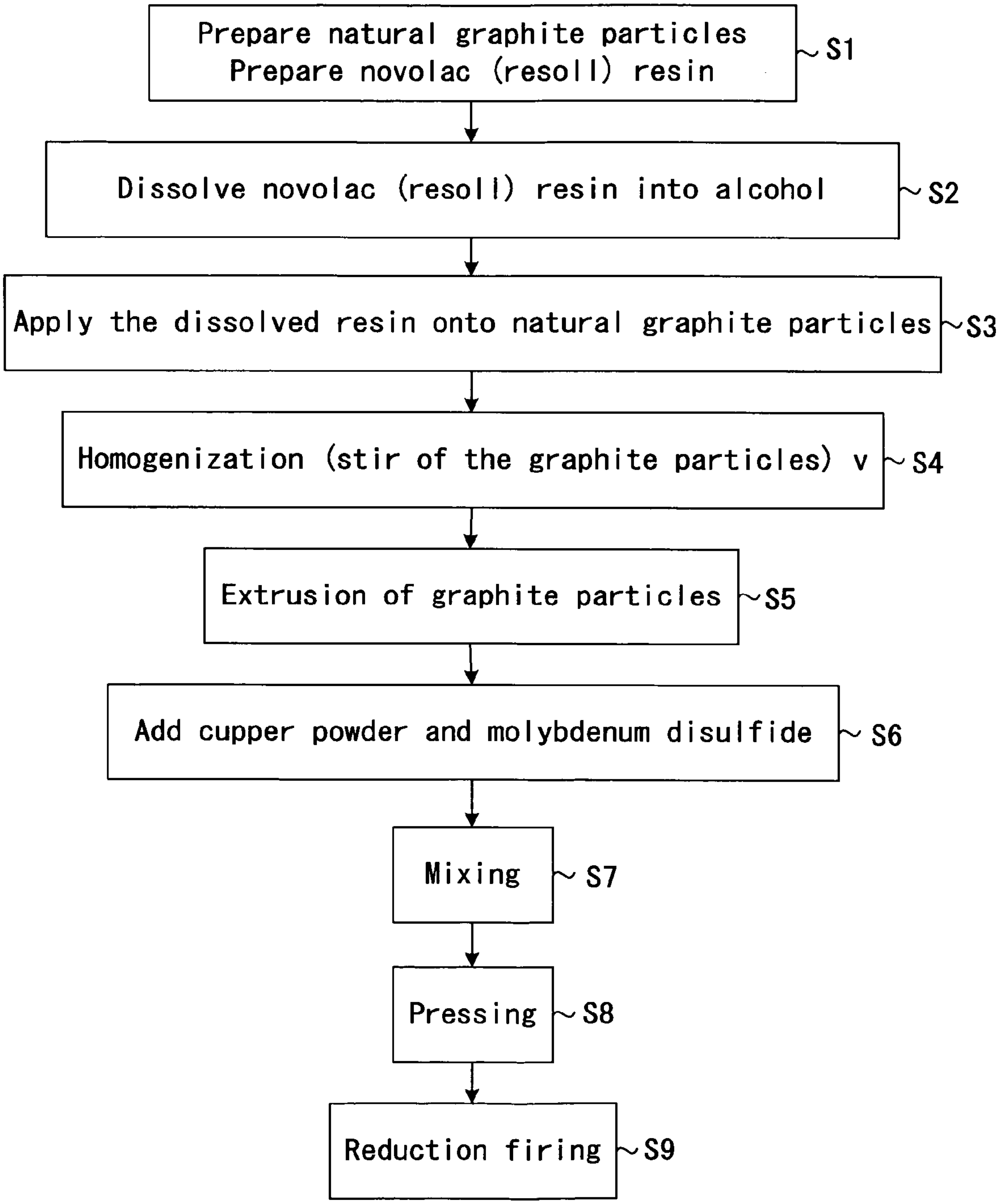
FIG. 3 illustrates a process diagram indicating a process of manufacturing the metal-graphite brush.
Figure 4:
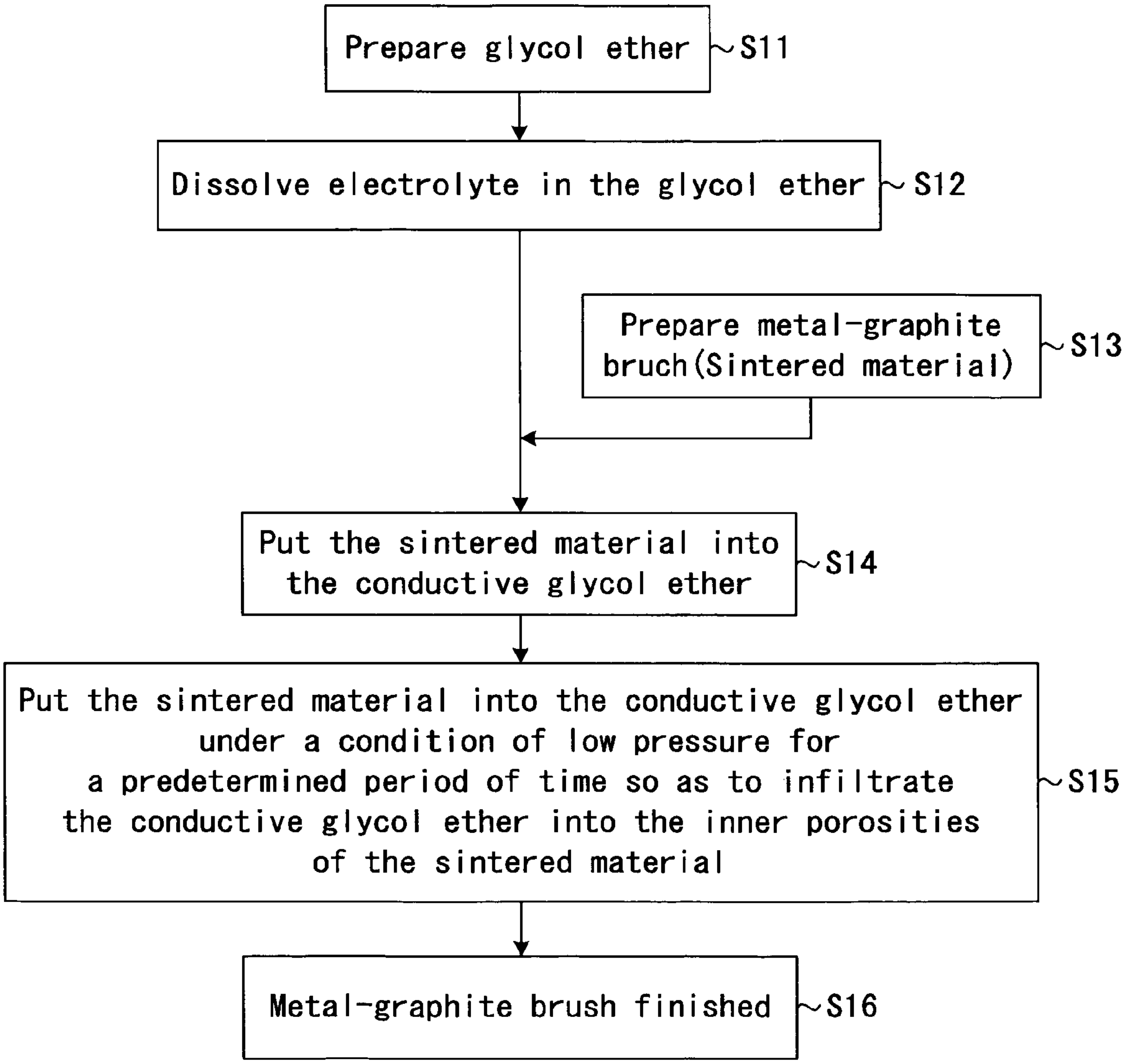
FIG. 4 illustrates a process diagram indicating a process of infiltration of alcohol into metal-graphite brush.

Next, with reference to FIG. 4, a process for infiltrating the liquid 21 into the porosities 19 formed at the sintered material 22, which has been made up by the processes described in FIG. 3, will be explained below.

The liquid 21 infiltrated in the porosities 19 formed on the surface or inside the sintered material of the metal-graphite brush 1 has a boiling point higher than that of water (100 degree Celsius) and conductive property.

The liquid 21 is not limited as long as it includes conductive liquid that has a boiling point higher than that of water (100 degree Celsius). The liquid 21 may include single kind of solvent which has a boiling point higher than that of water and conductive property, or the liquid 21 may include a solvent of liquid having a boiling point higher than that of water and a solute of an electrolyte. Thus, even when the solvent has insulating property, because conductive property can be applied to the solvent by adding and dissolving electrolyte thereinto, the solvent can be selected arbitrarily unless it can dissolve the electrolyte. It is not necessary to use a single kind of solvent, and a mixture of plural kinds of solvent can be used. When the slide surface of the brush 1 sliding on the commutator 8 becomes 100 degree Celsius or more, it is preferable to use a solvent that has a boiling point higher than a temperature near the slide surface of the brush 1.

Specifically, in this point of view, a conductive solution including, for example, the glycol ether type liquid or the glycol type liquid, which have good effects of gaseous lubrication, as solvents is preferably used as a liquid 21.

Processes for infiltrating the liquid 21 containing plural kinds of glycol ether into the porosities 19 of the sintered material 22 are as follows. In this case, the liquid 21 is a glycol ether type conductive solution. First the glycol ether type liquid is prepared for making the liquid 21 (S11). Next, an electrolyte is dissolved into the glycol ether type liquid (S12) in order to apply conductive property thereto.

An the sintered material 22, made by a process of sintering, and that is to become a brush 1, is prepared (S13) and put into the glycol ether type conductive solution prepared in S12 (S14). Then, the sintered material 22 put in the glycol ether type conductive solution is left in a condition of low pressure of approximately 133 Pa for a predetermined period of time (for example for from 1 to 2 minutes). In this condition, atmospheric air originally included in the porosities 19 is removed, and the porosities is filled with the glycol ether type conductive solution instead. Thus, the glycol ether type conductive solution is infiltrated into the porosities 19 (S15). After the atmospheric gas containing moisture originally included in the porosities 19 of the sintered material 22 is completely replaced by the solution of glycol ether type conductive solution, the sintered material 22 in the glycol ether type conductive solution is restored to a condition of atmospheric pressure. Thus, a metal-graphite brush according to the embodiment of the present invention is completed in which the glycol ether type conductive solution has been infiltrated into the porosities formed both at the surface and inner of the sintered material 22 (S16).

During the above processes, the process of infiltrating the liquid 21, which has a boiling point higher than that of water (100 degree Celsius or more) and conductive property, into the porosities 19 formed at the sintered material 22 of the brush 1, and the process of retaining the liquid 21 in the porosities 19 formed in the sintered material 22, the atmospheric gas originally included in the porosities 19 of the sintered material 22 is replaced by the liquid 21. In the processes described above, only a single kind of liquid was infiltrated, however, the liquid 21 may be a mixture of plural kinds of liquid. Even in these circumstances, the liquid 21 can be infiltrated by means of the above mentioned process. In other words, preparing the liquid 21 containing other kinds of substances in the step S11 described above, the metal-graphite brush 1 according to the embodiment of the present invention can be made.

By using the metal-graphite brush 1 according to the embodiment of the present invention, when the motor is in operation (in other words, when the brush slides on the commutator 8), a coefficient of sliding friction of the slide surfaces can be lowered because of vapor from the liquid 21 exists on the slide surfaces of the brush 1 and the commutator 8. Moreover, even when the brush 1 is operated in conditions where the temperature of the brush 1 rises above 100° C., because the liquid 21 does not completely vaporize under a temperature lower than the boiling point of the liquid 21, the liquid 21 exists on the slide surfaces of the brush 1 and the commutator 8 does not completely disappear. Accordingly, unlike in the case of conventional brushes, mechanical loss caused by a wear can be improved.

As is common with liquids having a boiling point, vapor pressure of the liquid rises abruptly when the temperature of the liquid rises to close to boiling point, and the vapor pressure of the liquid becomes atmospheric pressure of 1 at boiling point. Therefore, much of vapor of the liquid 21 which has infiltrated into the porosities 19 of the brush 1 under low pressure-conditions does not vaporize until the temperature of the porosities 19 near the slidable contacting surface of the brush 1 approaches the boiling point of the liquid 21. In addition, if the brush 1 is utilized at a temperature close to boiling point, because the vapor pressure is heavy, and thus much of the liquid 21 is consumed, the vapor cannot be sufficiently supplied to the slide surfaces of the brush 1 over a long period of time.

Further, concomitantly with the introduction of vehicles having an engine driven by electric power, the motor 10 has also gradually come to be utilized in parts for engine systems, and in control systems for a vehicle. In particular, when engine parts such as a water pump or an oil pump are intended to be replaced by electric motors, the electric motor need to be applicable for substantially longer continuous operation times than those of vehicle body parts such as an electric window system. Continuous operation times achieve several hours in some cases. Because continuous operation times of the motor 10 have become longer, there is a danger of the average temperature of the slide surfaces of the brush 1 rising from 150° C. up to approximately 250° C. In such circumstances, it is preferable that, even when the motor 1 is utilized in any atmospheric temperature, vapor from the liquid 21 exist between the slide surfaces.

A type of the solvent of the liquid 21 is not limited unless it has a boiling point higher than that of water, and the solvent can be selected arbitrary. However, in order to obtain effects of gaseous lubrication under a low temperature for example at 100 degree Celsius or below, it is preferable that the liquid 21 is infiltrated with water, in other word, it is preferable that the liquid 21 has water solubility. Further, it is preferable that a substance having hygroscopic property is used as a liquid 21. Thus, the brush 1 can absorb hydrosphere in the air and store in the porosities 19, as a result, moisture in the porosities 19 can be complemented. Further, when the liquid 21, in which plural kinds of liquids are mixed, is used, it is preferable that each of liquids has compatibility and is not pyrolytically decomposed within a temperature range at which the motor 10 is operated so that each of liquids vaporizes at different temperatures within a predetermined temperature range. Furthermore, when the liquid whose molecular mass is large is used in order to provide effects of gaseous lubrication, density of molecules per cubic volume on the slide surface becomes high, as a result, the effects of gaseous lubrication can be enhanced.

In such point of views, as mentioned above, the glycol ether type liquid having water solubility and hygroscopic property or the glycol type liquid having water solubility and hygroscopic property is preferably used as the liquid 21. Further, when plural kinds of the glycol ether type liquid and the glycol type liquid are mixed, unless they have water solubility, they can be mixed together.

When the motor is operated, and the metal-graphite brush 1 in this embodiment according to the present invention slides on the commutator 8, a temperature on the slide surface on the metal-graphite brush 1 rises, and then the liquid 21 infiltrated into the porosities 19 is cubical expanded so as to exude on the slide surface of the brush 1. By virtue of the conductive property of the liquid 21, the contact resistance between the brush 1 and the commutator 8 can be reduced, further, the electrical loss can be improved. In addition, in accordance with the reduction of the contact resistance, spark generated on the slide surfaces of the commutator 8 and the brush 1 can be reduced, as a result, the mechanical wear on the slide surfaces caused by the spark can be reduced.

In order to provide conductive liquid 21 continuously on the slide surface of the brush 1 when the motor is operated (the brush 1 slides on the commutator 8), it is preferable that the liquid 21 is infiltrated not only into the porosities 19 formed on the surface of the metal-graphite brush 1 but also to porosities 19 formed inside the metal-graphite brush 1. Specifically, when the metal-graphite brush 1 slides on the commutator 8, generally the brush 1 wears at first. As the slide surface of the brush 1 wears, and another porosities 19, which has been formed inside of the metal-graphite brush 1, appear on the slide surface of the brush 1, as a result, the liquid 21 can exudes from the metal-graphite brush 1 continuously.

In order to exude the liquid 21 effectively on the slide surface of the metal-graphite brush 1, it is preferable that the cubical expansion rate of the liquid 21 is relatively large. Examples of the cubical expansion rates of the glycol ether type liquid and the glycol type liquid which can provide good effects of gaseous lubrication under a temperature of 100 degree Celsius or more will be explained as follow.

As shown in Table 1, each of these substances has high cubical expansion rate from 0.6×10−3/degree Celsius to 1.0×10−3/degree Celsius. These rates are significantly larger than that of the graphite particles and copper.

Thus, because the cubical expansion rate of the glycol ether type liquid or the glycol type liquid is significantly larger than that of the solid which consists the slide surface of the brush, the liquid 21 infiltrated into the inner porosities 19 at low pressure can certainly exude.

Further, because temperatures of the glycol type liquid and the glycol ether type liquid, which are infiltrated into the inner porosities 19 formed inside of the metal-graphite brush 1 and exist near the contact point with the commutator 8, rises at first, cubic volumes of the glycol type liquid and the glycol ether type liquid expand, as a result, the glycol type liquid and the glycol ether type liquid exude from the porosities 19.

For example, the glycol ether type liquid and the glycol type liquid infiltrated into the porosities 19 at low pressure under a room temperature can expand by 10□ of its cubic volumes in circumstances where an average temperature on the slide surface of the brush becomes at 150 degree Celsius.

TABLE 1

| substances | cubical expansion rate ($\times 10^{-3}$ /degree Celsius) |
|---|---|
| ethylene glycol monomethyl ether | 0.95 |
| ethylene glycol monoethyl ether | 0.97 |
| ethylene glycol isopropyl ether | 0.93 |
| diethylene glycol | 0.64 |
| diethylene glycol monomethyl ether | 0.86 |
| diethylene glycol monoethyl ether | 0.82 |
| diethylene glycol monobutyl ether | 0.87 |
| triethylene glycol | 0.71 |

However, because each of the glycol ether type liquid and the glycol type liquid has insulating property, it is concerned that, even if these liquids are provided on the slide surface of the brush 1, the electrical loss may not be improved, and more likely increased. Further, because an electrical resistance on the slide surface is enhanced, spark is easily generated, as a result, the mechanical wear on the slide surface of the metal-graphite brush 1 may be increased. Thus, when the glycol ether type liquid and the glycol type liquid are used in the liquid 21, it is preferable that a conductive material is added to the liquid 21 in order to apply conductive property thereto.

Thus, in this embodiment, an electrolyte is dissolved as a solute in the liquid such as the glycol ether type liquid and the glycol type liquid, having insulating property or low conductive property, in order to apply conductive property to the liquid 21. It is preferable to use an electrolyte that has high solubility in the solvent. Further, it is preferable to use the electrolyte by which electric conductivity of the solution, in which the electrolyte is dissolved, becomes high, a vapor pressure of the solution has approximately same temperature characteristics as that of the solvent, and the solution has appropriate effects of gaseous lubrication.

In light of the above conditions, a metallic salt can be uses as one of good examples of electrolyte. Specifically, a metallic salt having high solubility in water can be a better example. Thus, such metallic salt can be dissolved with high solubility in a solvent such as the glycol ether type liquid and the glycol type liquid, accordingly, electric conductivity of the solution in which the metallic salt is dissolved can be enhanced.

Table 2 shows examples of metallic salts and whose solubility in water.

As shown in Table 2, potassium acetate and sodium acetate have relatively high solubility in water and can precipitate concentrated metal ion.

TABLE 2

| metallic salts | Solubility in water (100 g) |
|---|---|
| potassium hydrogen carbonate $KHCO_3$ | 25 g (20 degree Celsius) |
| sodium hydrogen carbonate $NaHCO_3$ | 9.96 g (30 degree Celsius) |
| potassium acetate 0.5 hydrate $CH_3CO_2K.0.5H_2O$ | 4130 g (30 degree Celsius) |
| potassium acetate $CH_3CO_2K.1.5H_2O$ | 256 g (20 degree Celsius) |
| sodium acetic anhydride $CH_3CO_2Na$ | 4580 g (40 degree Celsius) |
| Sodium acetate $CH_3CO_2Na.3H_2O$ | 46.2 g (20 degree Celsius) |
| calcium acetate $(CH_3CO_2)_2Ca.2H_2O$ | 34.7 g (20 degree Celsius) |

Furthermore, it is preferable that the liquid 21 has no chemical effect on the commutator 8 on which the brush 1 slides. Specifically, because the commutator 8 is made of metal in which an extremely little amount of silver is mixed into oxygen free copper, it is preferable that the liquid 21 does not include substances that chemically react with oxygen free copper or silver. In other words, it is not preferable that the liquid 21 include the conductive liquid does not include corrosive ion, such as halogen ion and sulfate ion, and substances that comprise copper chloride, copper hydrate chloride and copper hydroxide.

Figure 5:
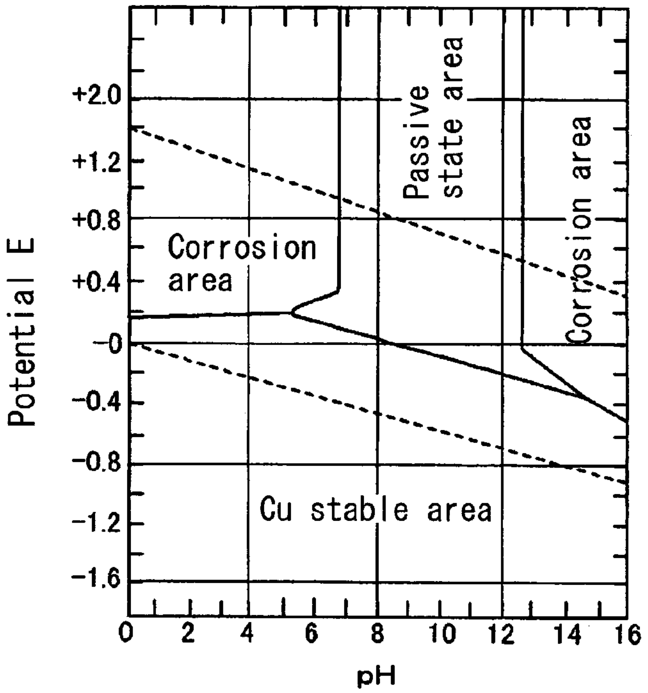
FIG. 5 illustrates a graph indicating corrosion of copper.

Corrosion of copper will be explained in detail. Equilibrium electrode potential E of copper Cu2+ based on a hydrogen scale can be obtained by a formula E=+0.337+0.0295 log (Cu2+). Copper is one of inert metals which are more noble than hydrogen. As shown in FIG. 5, which illustrates a graph indicating corrosion of copper, copper is not corroded without oxidant.

When the glycol ether type liquid or the glycol type liquid is used as a solvent, it is only considered that the oxidant can be a small amount of dissolved oxygen.

Figure 6:
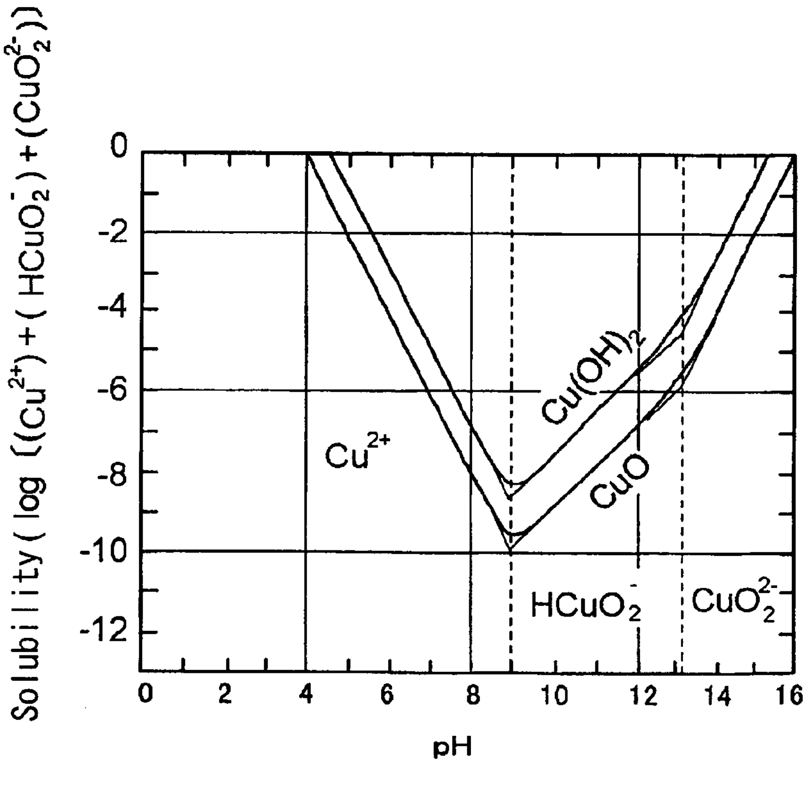
FIG. 6 illustrates a graph indicating solubility of copper oxide and hydroxide depending on pH.

When the copper is corroded by the small amount of dissolved oxygen, within an alkalescent range, from neutral to pH13, the copper is changed so as to be in a passive state by an oxide film or a hydroxide film, as a result, corrosion resistance can be applied to the copper. FIG. 6 illustrates changes of solubility of the copper oxide and hydroxide. As shown in FIG. 6, which shows change of the solubility of a copper oxide and a copper hydroxide depending on pH, even when the copper is oxidized by the oxidant, within a range from pH9 to pH13, the copper becomes $HCuO_2^-$, however, because its solubility is extremely small, it may be considered as an undissolved substance. Further, when the copper is partially corroded so as be in, so called "formicary corrosion of a copper pipe", which is hardly found with the unaided eye, a solution, which is set from neutral to alkalescent, is preferably used. Thus, in consideration of a corrosion behavior of the copper, it is preferable that the liquid 21 includes a solution from pH 7 to pH 11, more preferably, an alkalescent solution whose pH is around 9.

Table 2 illustrates metallic salts, whose solubility in water is relatively high. When an sodium acetic anhydride 50 g is dissolved in purified water 200 cc, pH becomes from 8.2 to 8.8, and when potassium acetic anhydride 50 g is dissolved in purified water 500 cc, pH becomes from 7.8 to 9.0. Further, even when the amount of the solute is changed, pH is hardly changed. For example, when potassium acetic anhydride 100 g is dissolved in purified water 500 cc, pH rises by 0.1. In addition, an aqueous solution of hydrogen carbonate shown in Table 2 is alkalescent, and for example, the sodium hydrogen carbonate aqueous solution become pH 8.2. Thus, each of the above mentioned metallic salts has high solubility in water, and pH of aqueous solution of each metallic salt is around 8, these metallic salts are preferably used as electrolytes in present invention.

Table 3 illustrates equivalent conductances of aqueous solutions in which above metallic salts are dissolved. Specifically, the equivalent conductance defines a conductivity of the electrolyte. Comparing to a typical electrolyte of potassium hydroxide or hydrogen chloride, equivalent conductances of the metallic salts shown in Table 3 approximately equal to equivalent conductances of potassium hydroxide or hydrogen chloride.

TABLE 3

| | equivalent conductance at 25 degree Celsius ($\Omega^{-1}cm^2mol^{-1}$) | | | |
|---|---|---|---|---|
| Metallic salts | 0.001 mol/l | 0.005 mol/l | 0.01 mol/l | 0.02 mol/l |
| potassium acetate | — | 109.8 | 108.2 | 105.6 |
| Sodium acetate | 88.5 | 85.75 | 83.76 | 81.24 |
| potassium hydrogen carbonate | 115.3 | 112.2 | 110.1 | 107.2 |
| Sodium carbonate | 112.0 | 102.5 | 96.2 | 89.5 |
| Sodium hydrogen carbonate | 93.5 | 90.3 | 88.1 | 85.5 |
| potassium hydroxide | 268.8 | 264.8 | 261.8 | 257.9 |
| hydrogen chloride | 421.4 | 419.2 | 411.1 | 406.1 |

In addition to the above metallic salt, metallic soap and surface-active agent can be another examples whose aqueous solution is approximately pH 9. As shown in Table 4, fatty acid alkanolamine salts, fatty acid ammonium salts, or fatty acid triethanolamine salts, whose solubility in water is relatively high and its aqueous solution is pH 10 or below, can be preferably used. The fatty acid salts include straight chain fatty acid, whose number of the main chain carbon is equal to or more than 6, such as salts of potassium or sodium.

TABLE 4

| substance | PH |
|---|---|
| fatty acid sodium soap | 10.3–10.7 |
| fatty acid potassium soap | 10.0–10.6 |
| fatty acid alkanolamine salt (amino soap) | approx. 9 |
| fatty acid ammonium salt (ammonium salt soap) | approx. 9 |
| fatty acid triethanol-amine salt | approx. 8 |
| superfatted soap | 8–9 |
| sodium N-acyl-L-glutamate (AGS) (amino acid synthetic detergent comprised of N-acyl amino salts) | 8 or below |
| triethanolamino N-acyl-L-glutamate (amino acid synthetic detergent comprised of N-acyl amino salts) | 8 or below |
| sodium N-acyl-N-methyl taurate (AMT) (amino acid synthetic detergent comprised of N-acyl amino salts) | 8 or below |
| sodium N-acyl-N-methyl taurate (AMT) (use methyl taurate instead of glutamic acid) | 8 or below |
| sodium monoalkyl phosphate (MAP) (alkyl phosphate detergent) | 8 or below |
| sodium poly oxyethylene alkyl ether phosphate (copolymerize ethylene oxide) | 8 or below |

As mentioned above, a solution, in which a solvent having effects of gaseous lubrication and an electrolyte are mixed, is applied to the metal-graphite brush, so that the porosities 19 formed on the surface of the metal-graphite brush and the porosities 19 formed inside the metal graphite brush is infiltrated with the solution. On the slide surface of the metal-graphite brush, the conductive liquid 21, which is infiltrated into the inner porosities 19 at low pressure, exudes, at the same time, a solvent in the exuded liquid 21 vapors depending on the temperature on the slide surface. In virtue of the liquid 21 exuded on the slide surface of the metal-graphite brush 1, a mechanical loss, caused by wear and spark, and an electrical loss can be improved. Especially, because the electrical loss is improved by use of the conductive solution, an output effect of the motor having the metal-graphite brush 1 can be enhanced.

An actuation of the motor 10 having the metal-graphite brush 1, in which the liquid is infiltrated at low pressure in the porosities 19 formed inside and a surface of the metal-graphite brush 1, will be explained based on the examples. In this test, metal-graphite brush 1 whose size is 4.5 mm×9.0 mm is used, and a load applied to commutator 8 by the brush 1 is set at 78.5 kPa. Further, under a circumstance where an electric current at 10 A is applied between the brush 1 and the commutator 8, the motor 10 is rotated at 3.6 m/s. The motor 10 has been rotated for 100 hours in a row under an atmospheric temperature of 100 degree Celcius.

In the liquid 21, a solute, whose pH is 10 or below when it is dissolved in water and whose equivalent conductance is relatively large, is dissolved in triethyleneglycol monomethyl ether (TM), which is glycol ether having water solubility, high hygroscopic property and a boiling point at 248.4 degree Celsius, so that it is hardly thermally decomposed even when it is heated to around 230 degree Celsius. Table 5 indicates types of solutes and its amount used in each example.

TABLE 5

| example | solute | Solubility in TM 500 ml (g) |
|---|---|---|
| 1 | potassium acetic anhydride | 50 |
| | | 100 |
| | | 200 |
| 2 | sodium acetic anhydride | 50 |
| | | 100 |
| | | 200 |
| 3 | potassium hydrogen carbonate | 20 |
| | | 50 |
| | | 100 |
| 4 | sodium hydrogen carbonate | 10 |
| | | 20 |
| | | 30 |
| 5 | fatty acid alkanolamine potassium | 50 |
| | | 100 |
| | | 150 |
| 6 | fatty acid alkanolamine sodium | 50 |
| | | 100 |
| | | 150 |
| 7 | fatty acid triethanolamine potassium | 50 |
| | | 100 |
| | | 150 |
| 8 | fatty acid | 50 |

TABLE 5-continued

| example | solute | Solubility in TM 500 ml (g) |
|---|---|---|
| | triethanolamine | 100 |
| | sodium | 150 |

Table 6 shows results of the test. In each of the examples, contact resistance can be reduced comparing to the conventional motor whose contact resistance is 50 mΩ. Further, generally the level of the contact resistance depends on solubility and equivalent conductance of the solute, however, according to the results of the test, the contact resistance more depends on the equivalent conductance. Furthermore, the wear amount on the brush can be further reduced.

TABLE 6

| example | contact resistance (mΩ) | Wear amount (%) |
|---|---|---|
| 1 | 5 | 40 |
| | 3 | 50 |
| | 3 | 50 |
| 2 | 15 | 25 |
| | 10 | 30 |
| | 10 | 30 |
| 3 | 8 | 30 |
| | 5 | 35 |
| | 5 | 35 |
| 4 | 18 | 20 |
| | 12 | 25 |
| | 12 | 25 |
| 5 | 18 | 20 |
| | 12 | 25 |
| | 12 | 25 |
| 6 | 20 | 15 |
| | 16 | 18 |
| | 16 | 18 |
| 7 | 20 | 12 |
| | 16 | 15 |
| | 16 | 15 |
| 8 | 22 | 10 |
| | 18 | 12 |
| | 18 | 12 |

As mentioned above, the conductive liquid 21 is applied to the metal-graphite brush, so that the porosities 19 formed on the surface of the metal-graphite brush and the porosities 19 formed inside the metal graphite brush is infiltrated with the liquid 21. In this configuration, effects of gaseous lubrication can be obtained, and further, because of synergy effects between the reduction of the spark and the gaseous lubrication, the wear amount on the metal-graphite brush 1 can be reduced. In addition, because the contact resistance between the brush 1 and the commutator 8 can be reduced, the output of the motor 10 can be enhanced.

A motor having a metal-graphite brush according to an aspect of the present invention can be applied for a vehicle use, such as a motor for actuating a water pump for purposes of cooling an engine of a vehicle, a motor for actuating a cooling fan, and a motor for actuating an oil pump of an engine. However, the present invention is not limited, and can be applied for versatile applications.

According to the present embodiment, a metal-graphite brush for supplying electricity to a coil wound around a core provided at a rotor of a motor is made of sintered material having porosities at a surface of, and inside, the sintered material, and the porosities is infiltrated with a conductive liquid having a boiling point higher than that of water.

In this configuration, porosities formed on the surface and inside of the sintered material of the metal-graphite brush is infitrated with liquid having a boiling point higher than that of water. Thus, even when the motor is used under a temperature of 100 degree Celsius or more, moisture contained in inner porosities located near the slide surfaces of the metal-graphite brush does not completely vaporize, and the vaporized moisture exists on the slide surfaces of the metal-graphite brush and the commutator. Thus, because of the effects of gaseous lubrication, a coefficient of sliding friction between the slide surfaces of the metal-graphite brush and of the commutator can be reduced, as a result, degree of the wear on the metal-graphite brush can be decreased. In this case, the porosities formed on the sintered material can be infiltrated with liquid at low-pressure.

Further, according to the above mentioned metal graphite brush, liquid having a boiling point higher than that of water is used as conductive liquid, and the liquid exudes from the porosities as the temperature on the slide surfaces rise, and the liquid exists on the slide surfaces. Thus, conductive property is applied to the slide surfaces of the metal-graphite brush and of the commutator, as a result, a contact resistance between the metal-graphite brush and the commutator can be reduced. Thus, the electrical loss can be improved. Further, because a contact resistance between the metal-graphite brush and the commutator is reduced, sparks does not occur frequently, as a result, the mechanical loss can be improved.

Thus, mechanical loss and electrical loss on the metal-graphite brush can be improved.

According to the metal-graphite brush in the present embodiment, the conductive liquid includes a solvent of liquid having a boiling point higher than that of water and an electrolyte serving as a solute.

In such configuration, even when the liquid has low conductive property or insulating property, conductive property can be applied to the liquid by dissolving an electrolyte as a solute into the liquid. Thus, the liquid as a solvent can be arbitrary selected. In this way, because the liquid having nonconductive property can be used as a solvent having effects of gaseous lubrication, the electrical loss can be improved, and the mechanical loss can be further improved.

According to the metal-graphite brush in the present embodiment, the electrolyte includes a metallic salt.

In this configuration, because the metallic salt has a high solubility in the solvent, a level of an electrical conductive property of the solution in which the metallic salt is dissolved into the solvent can be enhanced. Thus, the electrical loss can be further improved.

According to the metal-graphite brush in the present embodiment, the electrolyte includes either one of a metallic soap or an anionic surface-active agent.

In this configuration, because the metallic salt has a high solubility in the solvent, a level of an electrical conductive property of the solution in which the metallic salt is dissolved into the solvent can be enhanced. Thus, the electrical loss can be further improved.

According to the metal-graphite brush in the present embodiment, the solvent includes a mixture of different types of liquids having different boiling points.

In this configuration, because each of the solvents infiltrated the porosities of the metal-graphite brush vaporizes at different temperatures, the moistures can exist at any point on the slide surfaces of the metal-graphite brush and the commutator, as a result, mechanical loss such as wear can be improved.

According to the metal-graphite brush in the present embodiment, the solvent includes at least one of water-soluble glycol type liquid having hygroscopicity or water-soluble glycol ether type liquid having hygroscopicity.

Because this configuration has a heat-stability, even when the motor is used under a high temperature, the solvent cannot be thermally decomposed, and can be evaporated at a predetermined temperature. Further, because the solvent has water solubility, water can be used as a liquid, which evaporates within a low temperature range up to 80 degree Celsius. Furthermore, when a mixture of plural kinds of liquids is used as the solvent, because each liquid has compatibility, they can be evenly mixed. Further, because the liquid has hygroscopic property, hydrosphere can also be taken into the porosities of the metal-graphite brush. Thus, within a wide temperature range, the mechanical loss caused by wear can be improved.

According to the metal-graphite brush in the present embodiment, a pH of the conductive liquid is set between 7 and 11.

In this configuration, because a chemical effect on the commutator, such as corrosion, can be minimized, the duration of life of the motor having the metal-graphite brush can be elongated. Specifically, when alkalescent solution whose pH is around 9 is used, a chemical effect on the commutator such as corrosion can be further minimized, as a result, the duration of life on the motor having the metal-graphite brush can be further elongated.

According to the present embodiment, a motor comprises a housing, a magnet provided within the housing, a rotor including a coil wound around a core and provided so as to face the magnet and be rotatable within the housing, a shaft for supporting the rotor to the housing, a commutator provide at the rotor for supplying electricity to the coil; and a metal-graphite brush sliding on the commutator, wherein the metal-graphite brush is made of sintered material having porosities at a surface of, or inside, the sintered material, and the porosities is infiltrated with a conductive liquid having a boiling point higher than that of water.

In this configuration, because the mechanical loss and the electrical loss of the metal-graphite brush are improved, a duration of life of the motor can be elongated, and an output effect of the motor can be enhanced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A metal-graphite brush, being made of sintered material and having porosities at a surface and inside thereof, for supplying electricity to a coil wound around a core provided at a rotor of a motor, and the porosities is infiltrated with a conductive liquid having a boiling point higher than that of water, wherein the conductive liquid includes a solvent of liquid having a boiling point higher than that of water and a solute of an electrolyte.

2. The metal-graphite brush according to claim 1, wherein the electrolyte includes a metallic salt.

3. The metal-graphite brush according to claim 2, wherein the metallic salt includes either one of potassium acetate or sodium acetate.

4. The metal-graphite brush according to claim 1, wherein the electrolyte includes one of a metallic soap and an anionic surface-active agent.

5. The metal-graphite brush according to claim 1, wherein the solvent includes a mixture of different types of liquids having different boiling points.

6. The metal-graphite brush according to claim 1, wherein the solvent includes at least one of water-soluble glycol type liquids having hygroscopicity and water-soluble glycol ether type liquids having hygroscopicity.

7. The metal-graphite brush according to claim 1, wherein plural glycol ether type liquids and glycol type liquids are mixed in the solvent.

8. The metal-graphite brush according to claim 1, wherein the conductive liquid excludes halogen ion, sulfate ion, copper chloride, copper hydrate chloride and copper hydroxide.

9. A metal-graphite brush, being made of sintered material and having porosities at a surface and inside thereof, for supplying electricity to a coil wound around a core provided at a rotor of a motor, and the porosities is infiltrated with a conductive liquid having a boiling point higher than that of water, wherein the conductive liquid includes one of a fatty acid alkanolamine salt, a fatty acid ammonium salt and a fatty acid triethanolamine salt, whose pH is 10 or less.

* * * * *